United States Patent [19]
Lehureau et al.

[11] 3,765,933
[45] Oct. 16, 1973

[54] METHOD FOR THE PROTECTION AGAINST AQUATIC PARASITES

[76] Inventors: Jean Lehureau, 54, grande rue de St. Rambert, Lyon; Louis Bourdon, 40, chemin des Balmes, St. Foy les Lyon, both of France

[22] Filed: June 28, 1972

[21] Appl. No.: 267,124

Related U.S. Application Data

[63] Continuation of Ser. No. 16,972, March 5, 1970, abandoned.

[52] U.S. Cl............ 117/132 R, 106/15 AF, 106/16, 106/236, 106/241, 117/148, 117/150, 260/41 C
[51] Int. Cl............................................. C09d 5/14
[58] Field of Search .................. 106/15 AF, 16, 17, 106/18, 236, 241; 424/286; 260/41 C; 117/132 R, 148, 150

[56] References Cited

UNITED STATES PATENTS

| | | | |
|---|---|---|---|
| 2,875,834 | 3/1959 | Shumard............................ | 424/286 |
| 3,056,721 | 10/1962 | Allais et al.......................... | 424/286 |
| 3,234,032 | 2/1966 | Leebrick et al. ................ | 106/15 AF |

FOREIGN PATENTS OR APPLICATIONS

| | | | |
|---|---|---|---|
| 1,180,627 | 6/1959 | France............................... | 424/286 |

*Primary Examiner*—Lorenzo B. Hayes
*Attorney*—Alvin Browdy et al.

[57] ABSTRACT

Method for protecting submarine works against aquatic parasites comprising applying to same a composition containing cuprous alkyl or alkylene thiocarbamates.

2 Claims, No Drawings

METHOD FOR THE PROTECTION AGAINST AQUATIC PARASITES

This is a continuation of Ser. No. 16,972 filed Mar. 5, 1970, now abandoned.

The present invention relates to compositions intended for destroying marine organisms or inhibiting their development on immersed works.

It is known that works immersed in sea water are liable to be fouled by marine parasites such as, especially, algae, mollusks and crustaceae. Engineering works such as harbor installations, piers, flying bridges, floodgates, drilling stations, installations for sea water treatment, etc., are invaded with deposits caused by numerous marine organisms which are very difficult to eliminate. The disastrous action of the different aquatic parasites is especially critical on cellulosic materials such as wood. On ship hulls oppressive formations occur which inhibit the rapid sliding in water of the ships and gives rise to a speed lowering, sometimes of 25 percent.

Among the parasites responsible for the precited disadvantages it is possible to quote: mollusks, such as pholades, xylophaga, borers; crustaceae such as Limnoria, Chelura and Cirripedia; algae; annelida; Hydroids, Bruzoa; ascidians; etc.

In order to obviate those disadvantages, it is the use in naval techniques to protect ship hulls by several coating layers, generally constituted by a wash primer painting, an anti-corrosion coating, and an anti-fouling paint which contains substances toxic with regard to marine micro-organisms. Among the commonly used toxic substances, the compounds based on copper have an important place. Cuprous oxide is practically recommended as one of the most efficient constituents of the precited active compositions.

It has now been found that when cuprous alkyl dithiocarbamates or cuprous alkylene bis-dithiocarbamates are substituted for classical copper derivatives, there is obtained such an increase in activity that, in the anti-fouling compositions containing them, it is possible to reduce greatly the amount of copper necessary compared with the use of cuprous oxide, the usual compound most commonly used until now. This reduction in copper necessary may be on the order of 900 percent, i.e., there is employed 1/10 the amount of copper which would be necessary in the use of cuprous oxide.

The precited compounds of copper used in the present invention are products easily available by reaction of an alkali metal dithiocarbamate on cuprous chloride in solution in an alkali metal chloride brine under stirring. Besides, they have been described by the applicant, as fungicidal new industrial products, in the French Patent No. 1,180,627 dated Oct. 23, 1956.

Moreover, it has been additionally found that the anti-fouling activity is also excellent when the precited cuprous derivatives are used in conjunction with well known metal alkyldithiocarbamates or alkylene bis-dithiocarbamates such as those of manganese, cadmium, zinc, nickel, iron, etc. The copper valence 1 compound may be either mixed in molecular state by coprecipitation with one or several of the other precited metal carbamates or deposited on these other carbamates in the form of films coating the elementary granules; these processes and the products obtained in this way are shown in U.S. Pat. application Ser. No. 748,621 filed on July 30, 1968 now U.S. Pat. No. 3,523,960 to one of the present inventors.

Among the alkyl-dithiocarbamates and alkylene-bis-dithiocarbamates which may be used, the monomethyl and the dimethyldithiocarbamates and ethylene-bis-dithiocarbamates are preferred.

Consequently an object of the invention is the utilization as an anti-fouling active agent for combating marine organisms of metal alkyldithiocarbamates or alkylene bis-dithiocarbamates among which there is at least copper of valence 1.

Another object consists of obtaining coatings and paintings for the protection of submarine works, in the formulation of which are used as pigments the precited cuprous dithiocarbamates, alone or under the form of dithiocarbamates of copper valence 1 and of one of the metals selected from the group of iron, manganese, zinc, cadmium and nickel.

Of course, there has already been recommended the use of metal dithiocarbamates containing copper for the manufacture of marine anti-fouling compositions. Yet always copper in valence II state was concerned. Now, cupric alkyl dithiocarbamates or alkylene bis-dithiocarbamates (called generally "of copper" in literature) have chemical and thermal stabilities much lower than the ones of the corresponding cuprous compounds. Moreover their pigmentary qualities and their behavior towards ultra violet rays are moderate as compared to cuprous thiocarbamates. Furthermore, the cupric compounds are hardly dispersible in the components commonly used in paintings and varnish compositions.

The "anti-fouling" compounds according to the invention have, on the contrary, all the properties generally desired for the pigments of paintings formulations for wood, steel, or other substrata to be protected against parasite animals. Indeed, they may be obtained, according to the processes described in the precited patents, in the form of fine powders having an homogeneous granule size which makes easier their penetrating power into lignous media. Moreover, they are very stable towards atmospheric agents and especially resist solar radiations. According to the nature and/or the relative proportions of the metals they contain — in accordance with the invention — they may present themselves within a large color scale going from yellow to dark brown which keeps its homogeneity even after accidental partial sedimentation of pigment.

Moreover, when using as active agents cuprous dithiocarbamates obtained in situ during the preparation of well known dithiocarbamates of zinc (zinebe), manganese (maneb) iron (ferrebe) the obtained dithiocarbamates are very stable and resist inflammability even when exposed to high temperatures as shown in the U.S. Pat. No. 3,523,960.

The coating and paint compositions within the scope of the invention contain, in conjunction with the precited anti-fouling agents, the classical constituents, particularly natural or synthetic binders such as drying oils, colophony and derivatives, polyvinyl or polyacrylic compounds, epoxy resins, alkyd resins modified or not with oils, polyurethanes etc.; possibly solvents such as aromatc hydrocarbons, for example, toluene, xylene or aliphatic hydrocarbons, for example as raw cuts of petroleum distillation, ketones such as methylethylketone or methylisobutylketone or plasticizers for the polymers such as high chlorinated biphenyls or dialkylphthalates; the binders may also be aqueous emulsions of polyvinyl or polyacrylic compounds. Said coating and paint compositions may also contain various additives of known type such as dispersing agents, for example alkali metal pyrophosphates, or soya lecithin, defoamers as silicones or complementary pigments or biocides, namely fungicide agents, etc.

The amount of metal dithiocarbamate to be used is adjusted with regard to paint viscosity and to the amount of said paint to deposit on the materials to be protected. Because of that, it may vary between large limits, but in a general way it may be indicated that the quantity of cuprous dithiocarbamate used is such that the final amount of Cu deposited on the substrate is comprised between 25 and 60 gm of Cu per m$^2$ of substrate surface, and this amount is sufficient to obtain the desired algicidal and molluskicidal actions. In general, the quantity of dithiocarbamates present in the coating composition is between 25 and 50 percent of the total weight of the dried coating.

The following examples illustrate some applications of compositions according to the invention and show their interest from the economical point of view. Except if otherwise stated, all the parts correspond to parts by weight.

EXAMPLE 1

In a ball-crusher the following formulation was prepared:

| | |
|---|---|
| Cuprous ethylene bis-dithiocarbamate | 35 parts |
| Colophony glyceric ester | 30 parts |
| Pentachlorinated biphenyl | 5 parts |
| Xylene | 30 parts |

Such a painting which contained 11.5% of copper as Cu valence 1 was applied on a steel plate previously coated with a classical layer of anti-corrosion protection, in order to obtain 330 gm of substance per m$^2$ (that is, 38 g/m$^2$ of Cu).

The protection obtained after one year achieved in sea on a hull ship was equivalent to that obtained by an anti-fouling painting having the same composition as hereinabove but in which 380 gm of Cu valence 1 per m$^2$ had been applied as cuprous oxide.

EXAMPLE 2

A paint of the following composition was made:

| | |
|---|---|
| Curpous ethylene bis-dithiocarbamate | 30 parts |
| Red iron oxide | 10 parts |
| Polyvinyl chloride resin | 8 parts |
| Colophony glyceric ester | 6 parts |
| Dibutyl phtalate | 1.5 parts |
| Methyl isobutyl ketone | 13.5 parts |
| Toluene | 31 parts |

Painting was applied on a plate in three successive layers in order to ensure a total coating of 350 gm per m$^2$, which corresponded to a Cu valence 1 amount of 35 gm/m$^2$. This protecting system has shown itself equivalent, in its anti-fouling action, to that constituted by three layers of a paint having an identical composition but based on cuprous oxide, containing 300 gm of Cu valence 1 per m$^2$.

EXAMPLE 3

On a wood-raft immersed in sea there was applied 300 gm/m$^2$ of the molluskicidal painting having the following composition:

| | |
|---|---|
| Cuprous monomethyl dithiocarbamate | 35 parts |
| Colophony glyceric ester | 30 parts |
| Pentachlorinated biphenyl | 5 parts |
| Xylene | 30 parts |

After one year of observation it has been noted that protection was equivalent to that of a paint having the same composition, but in which 300 gm of copper per m$^2$ had been deposited as Cuprous oxide (instead of 40 g/m$^2$ for the formulation according to the invention).

EXAMPLE 4

A marine anti-fouling paint has been made from the following constituents:

| | |
|---|---|
| Iron (valence II) and copper (valence 1) ethylene-bis-dithiocarbamate | 40 parts |
| Colophony glyceric ester | 30 parts |
| Hexachlorinated biphenyl | 5 parts |
| Organic solvent | 25 parts |

In applying 350 g/m$^2$ of this painting on a support exposed to marine micro-organisms action during a season (that is, 29 gm/m$^2$ of Cu) there was obtained a protection equivalent to the one brought by the same painting but in which there has been used as a pigment, cuprous oxide at the rate of 300 gm/m$^2$ of copper.

The mixed dithiocarbamate used hereinabove was prepared according to Pat. No. 3,523,960 by reaction of 0.5 mole of Fe SO$_4$, 7 H$_2$O and 1 mole of Cu Cl dissolved in a NaCl brine at 200 gm/l. with a mole of sodium ethylene bis-dithiocarbamate in an aqueous solution at 25 percent by weight. Temperature: 26°C; pH : 2. After filtration and water-washing, there was obtained a slurry with about 40 percent of dry extract.

EXAMPLE 5

The same performances as for anti-fouling paint of Example 4 were obtained in substituting for ferrous and cuprous dithiocarbamate, a mixed zinc and cadmium ethylene bis-dithiocarbamate the granules of which were coated, by precipitation in situ, with cuprous ethylene bis-dithiocarbamate.

This coating method, already described in U.S. Pat. No. 3,523,960, was used in the following way:

At a temperature of about 25° and a pH : 3,5, a solution of 0.85 mole of ZnCl$_2$ and 0.10 mole of CdCl$_2$ in 1800 ml of water was reacted with a solution of 0.95 mole sodium ethylene -bis-dithiocarbamate in 1800 ml of water. After filtration and water washing, the filter cake was put again in aqueous suspension by adding 0.5 mole of Cu Cl dissolved in a brine at 50 gm of NaCl per liter of water. This mixture was reacted with an aqueous solution (1800 ml) containing 0.25 mole of sodium ethylene bis-dithiocarbamate, maintaining pH at 2, at room temperature (25°C). After filtration and water washing, there was obtained, with about 40 percent of dry extract, a slurry of the desired pigment, having an orange-yellow color. The dry product, used in the example hereinabove, presented itself in the form of a powder having a color similar to that of the so-called Oregon pine.

It will be obvious to those skilled in the art that various changes may be made without departing from the scope of the invention and the invention is not to be considered limited to what is described in the specification.

What is claimed is:

1. In a method for protecting submarine works against aquatic parasites comprising applying an anti-fouling composition which consists essentially of a paint and an active agent, the improvement wherein said active agent comprises a metal salt of methyldithiocarbamic or ethylene bisdithiocarbamic acid, said metal being copper of valence 1 alone or in conjunction with a metal selected from the group consisting of zinc, manganese, iron, cadmium, and nickel wherein said dithiocarbamate comprises 25 – 50 percent by weight of said antifouling composition.

2. The method for protecting submarine works against aquatic parasites in accordance with claim 1 wherein said composition is applied in an amount such that the content of Cu of valence 1 deposited on said works is between 25 and 60 gm/m$^2$.

* * * * *

UNITED STATES PATENT OFFICE
CERTIFICATE OF CORRECTION

Patent No. 3,765,933      Dated October 16, 1973

Inventor(s) Jean DEBOREAU et al.

It is certified that error appears in the above-identified patent and that said Letters Patent are hereby corrected as shown below:

Assignment information was omitted from the face of the patent and should read as follows:

-- Assignee: Progil, Paris, France --.

Signed and sealed this 15th day of October 1974.

(SEAL)
Attest:

McCOY M. GIBSON JR.
Attesting Officer

C. MARSHALL DANN
Commissioner of Patents